United States Patent Office 2,768,965
Patented Oct. 30, 1956

2,768,965

ALLETHRIN AND RELATED INSECTICIDES

Harry A. Stansbury, Jr. and Howard R. Guest, South Charleston, W. Va., assignors to Union Carbide and Carbon Corporation, a corporation of New York No Drawing. Application July 18, 1952,
Serial No. 299,729

7 Claims. (Cl. 260—468)

This invention relates to the synthesis of insecticides analogous to those found in pyrethrum flowers, chrysanthemum cinerarifolium. It is concerned more particularly with improvements in producing these insecticides which comprise reacting chrysanthemum monocarboxylic acid anhydride with a substituted 3-methyl-2-cyclopenten-4-ol-1-one to form the insecticidally-active ester. It is concerned also with chrysanthemummonocarboxylic acid anhydride as a new chemical compound and a method of making it.

Two of the active constituents of pyrethrum flowers are esters of chrysanthemummonocarboxylic acid and substituted 3-methyl-2-cyclopenten-4-ol-1-ones. The synthesis of esters of this class was first accomplished in the laboratories of the United States Department of Agriculture. The following schematic equation illustrates the formation of a typical ester of this class. For convenience in describing the invention, reference is had more particularly to the ester in which the side chain on the cyclopenten ring is an allyl group, the ester being known as allethrin.

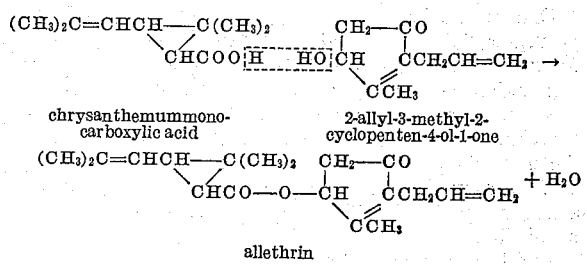

allethrin

Currently, the preparation of allethrin involves first the separate synthesis of chrysanthemummonocarboxylic acid and of 2-allyl-3-methyl-2-cyclopenten-4-ol-1-one. The application to these starting materials of conventional procedures for the formation of an ester from an alcohol and an acid, involving as they do elevated temperatures and long reaction periods, would result in deterioration of the cyclopentanone molecule and poor yields of allethrin. The process suggested by LaForge and others (J. Org. Chem., vol. 12 (1947), pp. 199–202; J. Chem. Soc. (1950), pp. 3552–63) involves the reaction of chrysanthemummonocarboxylic acid with thionyl chloride to make the corresponding acid chloride. The acid chloride in turn is reacted with the cyclopentenolone in the presence of pyridine to give allethrin. The series of reactions are illustrated by the following equation:

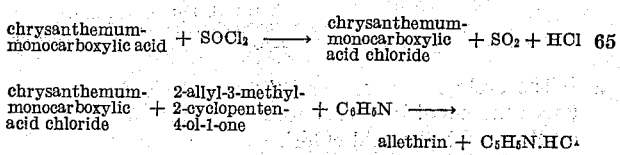

A number of difficulties are encountered in preparing allethrin by this procedure which are in addition to those presented by the corrosive nature of thionyl chloride and the noxious qualities of the sulfur dioxide and hydrogen chloride which are evolved. For instance, in the manufacture of the acid chloride, the unsaturated portions of both the acid and the acid chloride are exposed to the reactive compounds of sulfur dioxide and hydrogen chloride, and small amounts of these impurities are certain to add to the molecules at the ethylenic unsaturated bonds. Because the acid chloride is heat sensitive and difficult to purify by conventional procedures, it is difficult if not impossible to prevent impurities from being carried over to the ester stage and becoming impurities in the allethrin itself. The sulfur and chlorine compounds thus introduced to the allethrin are of unknown structure and there is a definite disinclination on the part of the Federal Food and Drug Administration to allow more than traces of such impurities in material to be used as a safe insecticide.

An even more fundamental difficulty in the acid chloride procedure arises from the nature of the cyclopentenolone used in the commercial production of allethrin. The cyclopentenolone is contaminated, it is believed, by coproduct alcohols. These coproduct alcohols, which have not yet been isolated and identified, are esterified by the acid chloride treatment to form esters which are extremely difficult to remove from the allethrin. Their insecticidal or other biological activity, on the other hand, appears to be only a small fraction of that attributed to pure allethrin. Without desiring to be bound by any particular theory, the presence of at least one such coproduct alcohol can be explained as follows. The synthesis of the cyclopentenolone proceeds through the formation of 3-hydroxy-8-nonen-2,5-dione. The cyclization of this compound leads to the formation of the desired 2-allyl-3-methyl-2-cyclopenten-4-ol-1-one probably through the intermediate, as illustrated by the following scheme:

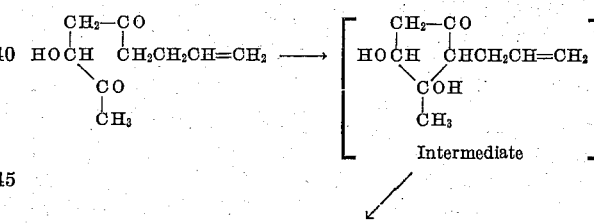

2-allyl-3-methyl-2-cyclopenten-4-ol-1-one

A minor portion of the intermediate is probably dehydrated by a competing reaction as follows:

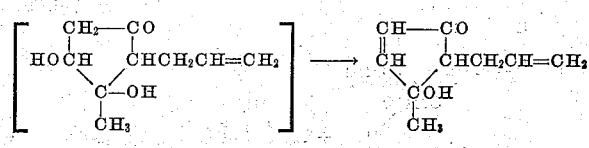

2-allyl-3-methyl-4-cyclopenten-3-ol-1-one

Thus, a tertiary alcohol isomer of the desired cyclopentenolone can be formed. The mixture is virtually impossible to separate by fractional distillation or any other practicable procedure. If the allethrin-yielding cyclopentenolone is reacted with the acid chloride of chrysanthemummonocarboxylic acid to form allethrin as set forth above, any tertiary alcohol impurity or contaminant therein would also be reacted as follows:

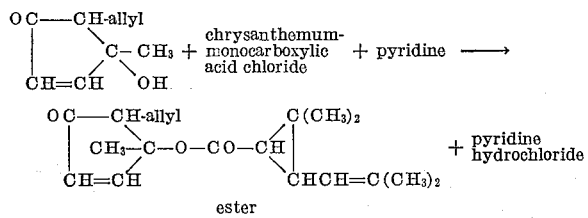

ester

Such an ester is isomeric with allethrin and would be extremely difficult to remove. It would not necessarily have the same or even similar order of biological activity as allethrin, however.

The presence of still another contaminant or impurity can be explained by the difficulty of separating completely from the desired 2-allyl-3-methyl-2-cyclopenten-4-ol-1-one, the 3-hydroxy-8-nonen-2,5-dione from which the former is derived by cyclization. Accordingly, some of the hydroxydiketone starting material is almost certain to be present as an impurity in the cyclic alcohol available for esterification to the allethrin. As illustrated in Example 9, this hydroxydiketone impurity does not react with chrysanthemummonocarboxylic anhydride to form an ester thereof except to a very limited extent of about a 5 or 6 percent yield. Apparently, the principal reaction that the impurity undergoes during the esterification is a dehydration to 3,8-nonadien-2,5-dione according to the following scheme:

$$CH_3COCHOHCH_2COCH_2CH_2CH=CH_2 \longrightarrow$$

3-hydroxy-8-nonen-2,5-dione $$CH_3COCH=CHCOCH_2CH_2CH=CH_2 + H_2O$$

3,8-nonadiene-2,5-dione

No difficulty is presented in separating this dehydration product from the allethrin by distillation.

However, when the allethrin is made by the acid chloride process, this hydroxydiketone impurity in the cyclopentenolone is not dehydrated to a readily separable material; but is itself esterified in high yield to the corresponding chrysanthemummonocarboxylic ester. As shown in Example 10, which follows, this hydroxydiketone impurity is convertible into the ester by the prior acid chloride process with yields as high as 62 percent. Because of the high boiling point of this ester, it cannot be readily separated from allethrin. As a contaminant in allethrin made by the acid chloride process, it is objectionable because of its low order of biological activity although, unfortunately enough, it analyzes as allethrin by the accepted methods of analyzing for allethrin content.

The present improvement is based on our discovery that allethrin of high purity and biological activity not obtainable by prior methods of manufacture can be produced by the reaction of 2-allyl-3-methyl-2-cyclopenten-4-ol-1-one with chrysanthemummonocarboxylic anhydride. The reaction can be illustrated by the following equation:

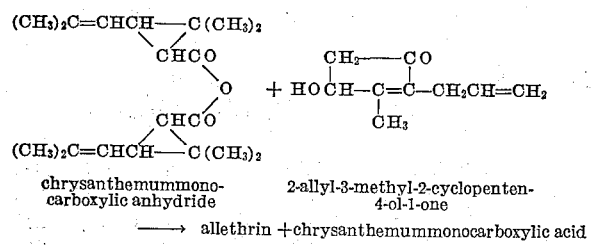

chrysanthemummono-  2-allyl-3-methyl-2-cyclopenten-
carboxylic anhydride   4-ol-1-one $\longrightarrow$ allethrin +chrysanthemummonocarboxylic acid The chrysanthemummonocarboxylic acid which is liberated in the reaction can be separated and recovered with good efficiency for conversion to the anhydride again, as in a cyclic process.

The reaction can be readily carried out simply by heating the chrysanthemummonocarboxylic anhydride and the cyclopentenolone dissolved in a suitable solvent. In accord with well-established principles, the time required for the reaction to near completion is dependent upon the temperature. In general, the reaction temperature should not exceed 200° C. in order to avoid decomposition. At temperatures below 100° C. the reaction rate tends to proceed too slowly for the procedure to be practicable. A temperature of about 150° C. to 175° C. is preferred.

As a medium for carrying out the reaction, any material which is capable of dissolving the reactants and which at the same time is not reactive with them or with the allethrin product at the temperatures employed can be used. If desired, the reaction can be carried out under reflux by choosing a solvent having a boiling temperature in the range of the reaction temperature. Representative of materials that can be employed as solvents are the following: diisopropyl ether, benzene, toluene, xylene, dibutyl ether, butyl ethyl ether, dihexyl ether. Dibutyl ether is preferred.

Usually a heating period of about 3 to 6 hours will be required for the reaction. At the end of that time the reaction mixture is diluted with additional solvent to diminish saponification of allethrin during the washing of the product with alkali. The solution is washed with alkali to remove the chrysanthemummonocarboxylic acid and then with water to remove the alkali. The wash liquids are then extracted with more solvent to minimize the mechanical loss of allethrin. The washed oil and the extracts are then combined and stripped of low boiling material by conventional procedures, as by reduced pressures, elevated temperatures, sparging with a non-reactive gas and the like. The allethrin is obtained as a residue product.

One of the important advantages of the present improvement is that the tertiary alcohol isomer and the hydroxydiketone which are likely to contaminate the cyclopentenolone do not react with the anhydride to form esters. Because the tertiary alcohol isomer does not react with the anhydride it can readily be removed from the allethrin by distillation as a lower boiling fraction. The hydroxydiketone is dehydrated by the anhydride to a product which is also easily separated from allethrin by distillation.

Another important advantage has been revealed by our studies in which we learned that allethrin prepared by the acid chloride reaction actually contains chrysanthemummonocarboxylic anhydride as an impurity. This anhydride impurity evidently is formed by the reaction of the acid chloride with some free acid present therein as contaminant at the same time that the acid chloride is reacted with the cyclopentenolone to form allethrin. Since the free acid is extremely difficult to separate from the acid chloride and because traces of water hydrolize the acid chloride to the acid, it is probable that some amount of acid will always be present in the acid chloride. The formation of the anhydride is represented by the following equation:

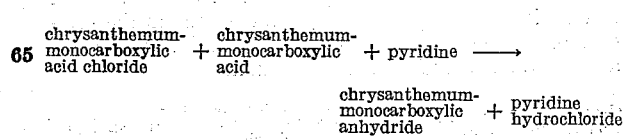

The cyclopentenolone and the anhydride do not react under the conditions used for the reaction of cyclopentenolone with the acid chloride.

The improvement is also based in part on our discovery that chrysanthemummonocarboxylic acid can be converted to the anhydride by reacting it with a lower carboxylic acid anhydride, for instance acetic anhydride. The reaction can be illustrated by the following equation:

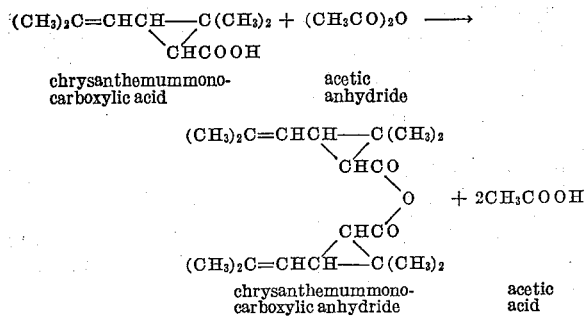

The reaction takes place readily upon heating the chrysanthemummonocarboxylic acid with the anhydride at a temperature of about 60° C. to 200° C. A temperature of about 130° C. is preferred. As far as is known the reaction is of the class or type referred to as reversible, and does not depart from well established principles and laws governing equilibria and reversible reactions. Accordingly, it will be understood that the equilibrium can be displaced in favor of the formation of the chrysanthemummonocarboxylic anhydride by such expedients as using an amount of the lower anhydride starting material which is greater than that required by theory to react with all of the acid, or by removing from the reaction mixture the lower carboxylic acid as it formed; or by a combination of expedients. Thus we prefer to carry out the reaction under a reflux for return to the reaction mixture of the anhydride starting material while the lower monocarboxylic acid is distilled off as it is formed. Other lower carboxylic acid anhydrides that can be used in addition to acetic anhydride are propionic, butyric, isobutyric anhydrides, and the like, or mixture of them. Upon the completion of the reaction, the chrysanthemummonocarboxylic acid anhydride can be purified by distillation under reduced pressure. Chrysanthemummonocarboxylic acid anhydride made in accordance with our improvement and which, as far as is known, has not previously been made and identified, has been found by us to have the following properties: equivalent weight as anhydride, 320 (theory, 318); boiling point at an absolute pressure of one millimeter of mercury, 144° C.; specific gravity (20/20° C.), 0.971; index of refraction ($n_D^{30}$), 1.4863; freezing point, below −25° C.

In illustration, by way of contrast, of the superior results obtainable in accordance with the present improvement, an experiment was carried out in which allethrin was made by the acid chloride method as follows: A mixture of 84.0 grams of 2-allyl-3-methyl-2-cyclopenten-4-ol-1-one having a purity of 90.45 percent (0.5 mol) and containing 3.37 percent (0.017 mol) of 3-hydroxy-8-nonene-2,5-dione; 49 grams (0.62 mol) of pyridine; and 250 grams of dibutyl ether was stirred while a solution of 98.5 grams of freshly distilled chrysanthemummonocarboxylic acid chloride (98.1 percent purity) dissolved in 100 grams of dry dibutyl ether was added dropwise over a period of 35 minutes. During the addition the reaction mixture was maintained at a temperature of 21° C. to 24° C., and the stirring continued for a period of two hours at about that temperature to allow the reaction to be completed.

Thereafter, the reaction mixture was washed successively with 250 milliliters of water, two successive portions of 250 milliliters of dilute hydrochloric acid (1 percent); 250 milliliters of aqueous sodium hydroxide (2 percent), and 250 milliliters of water. The acid washes extracted the pyridine as its hydrochloride, while the alkaline washes extracted chrysanthemummonocarboxylic acid from the product. The washes were then extracted successively, in order, with a 0.1 liter portion of dibutyl ether to minimize the loss of allethrin in the washes. The washed oil and extract were combined and stripped to a kettle temperature of 80° C. at an absolute pressure of 5 millimeters of mercury. The residue was then stripped with steam which was followed by sparging with nitrogen to remove traces of volatile material.

The residue product thus obtained weighed 153 grams and had a refractive index ($n_D^{30}$) of 1.5032. Upon analysis by the ethylene diamine method it was found to contain 91.1 percent of allethrin; 0.1 percent of chrysanthemummonocarboxylic acid; and 3.5 percent of anhydride calculated as chrysanthemum anhydride. The yield of allethrin was 92.3 percent based on the 2-allyl-3-methyl-2-cyclopenten-4-ol-1-one.

In contrast to the foregoing experiment of the preparation of allethrin by the acid chloride method are the following examples illustrative of the preparation of chrysanthemummonocarboxylic anhydride and its use in the production of allethrin.

EXAMPLE 1

A mixture was formed of 226 grams (1.345 mol) of chrysanthemummonocarboxylic acid, and 549 grams (5.38 mols) of acetic anhydride in a still kettle and the mixture distilled at atmospheric pressure until the kettle temperature rose to 170° C. and the head temperature to 133° C. The kettle residue was then stripped at a reduced pressure to 4 millimeters of mercury absolute to a kettle temperature of 100° C., to obtain 223 grams of residue. One hundred grams of this residue was distilled under reduced pressure. There was obtained 62 grams of the anhydride of chrysanthemummonocarboxylic acid having the following properties: equivalent weight as anhydride, 320 (theory), 318; boiling temperature at an absolute pressure of 1 millimeter of mercury, 144° C., specific gravity (20°/20° C.), 0.971; index of refraction ($n_D^{30}$), 1.4863; freezing temperature, below −25° C. Taking credit for 5 grams of product in the fore-fraction and 18 grams in the tails-fraction, the yield was 78 percent and the efficiency 90 percent, based on the chrysanthemummonocarboxylic acid.

The distillate boiling between acetic anhydride and chrysanthemum acid anhydride contained acetic anhydride, mixed anhydride, chrysanthemummonocarboxylic anhydride and a small amount of chrysanthemummonocarboxylic acid. The latter was converted to chrysanthemummonocarboxylic anhydride by reaction with acetic anhydride. A total of 873 grams of collected mid-fractions was mixed with 33 grams of acetic anhydride and distilled to a kettle temperature of 174° C. at atmospheric pressure over a period of 1.75 hours. The head temperature increased from 122° C. to 136° C. while 140 grams of distillate were removed. The residue was distilled under reduced pressure to collect 302 grams of main fraction which was 96.6% chrysanthemumonocarboxylic anhydride.

On the basis that 105 grams of product were present in the mid-cut and 15 grams of product were left in the column, it follows that 47 percent by weight of the original charge was converted to chrysanthemummonocarboxylic anhydride. Over 33% by weight of the original charge was collected as the main fraction having the high purity of 96.6%.

EXAMPLE 2

A mixture of 151 grams (0.895 mol) of chrysanthemummonocarboxylic acid (99.5 percent) and 48 grams (0.468 mol) of acetic anhydride contained in a still kettle was distilled with reflux. Throughout the distillation acetic anhydride was fed into the still kettle at such a rate that the kettle temperature was maintained at a temperature of 170° C. to 175° C. Over a period of two hours, 215 grams (2.1 mols) were fed while the head temperature increased to 135° C. from an initial value of 115° C.

Upon distillation of the residue under reduced pressure, 108 grams of main fraction were collected which was chrysanthemummonocarboxylic acid anhydride of 97.6 percent purity. The yield was 83 percent and the efficiency 97 percent, upon credit being taken for 9 grams of product in the fore-fraction and 5 grams in the tails-fraction.

EXAMPLE 3

A mixture of 338 grams (2 mols) of chrysanthemummonocarboxylic acid (99.5 percent) and 204 grams (2 mols) of acetic anhydride contained in a still kettle was distilled to a kettle temperature of 220° C. and a head temperature of 119° C. A period of 40 minutes was required. The residue was then distilled under a reduced pressure. There was obtained 290 grams of a main fraction which was chrysanthemummonocarboxylic acid anhydride having a purity of 94.2 percent. The yield was 91 percent and the efficiency 94 percent, taking credit for product present in the fore-fraction and the tails-fraction.

EXAMPLE 4

Chrysanthemummonocarboxylic anhydride was produced continuously in a glass-lined calandria fitted with a packed glass column of about twelve theoretical plates by feeding a mixture of chrysanthemummonocarboxylic acid and acetic anhydride in equimolar ratio into the column thereof. The calandria was operated at atmospheric pressure with the calandria temperature at 188° C. Acetic acid was removed continuously from the head of the column while crude chrysanthemummonocarboxylic acid anhydride was taken continuously from the top of the calandria. At a contact time of twelve minutes for the mixture, chrysanthemummonocarboxylic acid anhydride was produced with a yield of 97 percent and an efficiency of 99 percent, based on the chrysanthemummonocarboxylic acid anhydride.

EXAMPLE 5

Part 1

A mixture of 1162 grams of chrysanthemummonocarboxylic anhydride having a purity of 94.3 percent (3.444 mols) and containing 3.4 percent (0.235 mols) of chrysanthemummonocarboxylic acid; 567 grams of 2-allyl-3-methyl-2-cyclopenten-4-ol-1-one having a purity of 89.4 percent (3.338 mols) and containing 3.2 percent (0.106 mol) of 3-hydroxy-8-nonen-2,5-dione; and 885 grams of dry dibutyl ether was refluxed at a temperature of 169° C. for a period of four hours. At the end of that time the anhydride content of the mixture was found by analysis to have been reduced to 0.34 percent, which indicated that 99.2 percent of the anhydride had been reacted. The solution was diluted with 380 grams of dibutyl ether and washed successively with (a) 1880 grams of a 7.33 percent (3.444 mols) aqueous sodium hydroxide solution (b) 1800 grams of a 2 percent (0.90 mol) aqueous sodium hydroxide solution and (c) 1800 milliliters of water. The washes were then extracted with 500 milliliters of dibutyl ether. Thereupon the extract was combined with the washed oil and the combined dibutyl ether solution stripped of dibutyl ether and other low boiling material to a kettle temperature of 80° C. at a reduced pressure of 5 millimeters of mercury, absolute. The residue thus obtained was then further stripped with steam and sparged with nitrogen to remove traces of volatilizable material.

There was obtained 1052 grams of a residue product having an index of refraction ($n_D^{30}$) of 1.5025. This residue product was found upon analysis by the ethylene diamine method to have an allethrin content of 90.4 percent, and a chrysanthemummonocarboxylic acid content of 0.28 percent. The anhydride content was nil. Taking credit for the 4 grams of product consumed in the analytical examples, the yield of allethrin was 94.8 percent, based on 2-allyl-3-methyl-2-cyclopenten-4-ol-1-one.

Part 2

The third or water wash was stirred with 400 grams of isopropyl ether and at the same time 12 grams of concentrated hydrochloric acid were added to give a hydrogen ion concentration (pH) of 1, and the ether layer separated. This ether layer, which was found by analysis to contain only 0.37 percent chrysanthemummonocarboxylic acid, together with 800 grams of fresh isopropyl ether were added to the two caustic washes and the mixture stirred while 458 grams of concentrated hydrochloric acid were added at a temperature of 30° C. to 40° C. to make it strongly acidic (a hydrogen ion concentration (pH) of 1). The ether layer was separated and a second extraction made with 600 grams of isopropyl ether. From the combined extracts there was obtained, upon distillation, 600 grams of chrysanthemummonocarboxylic acid of a purity of 98.4 percent. An additional 8.3 grams of the acid were present in a small fore-fraction and 15 grams of acid were left in the still. Thus the total amount of chrysanthemummonocarboxylic acid recovered was 613 grams (3.65 mols) or 92.2 percent of that recoverable in theory.

A mixture of 598 grams of the recovered chrysanthemummonocarboxylic acid of 98.4 percent purity (3.5 mols) and 357 grams (3.5 mols) of acetic anhydride was distilled at a kettle temperature of 135° C. to 145° C. The pressure was reduced gradually during the distillation to maintain the kettle temperature in that range. A total of 336 grams was obtained which distilled at a temperature from 95° C. at an absolute pressure of 350 millimeters of mercury to 39° C. at 11 millimeters. Upon analysis, this fraction was found to contain 215 grams (3.58 mols) of acetic acid and 121 grams (1.19 mols) of acetic anhydride. A mid-fraction of 92 grams was then distilled from a temperature of 70° C. at a pressure of 3 millimeters to 152° C. at a pressure of 1.5 millimeters of mercury, absolute. This mid-fraction contained acetic anhydride, mixed anhydride and chrysanthemummonocarboxylic anhydride. The product fraction was distilled at a temperature from 152° C. to 160° C. at an absolute pressure of 1.5 millimeters of mercury. By analysis for chrysanthemummonocarboxylic anhydride, the purity of the product fraction was found to be 95.9 percent. The yield was 97.6 percent and the efficiency was 99 percent based on the acid charged.

Part 3

A mixture of 343 grams of the chrysanthemummonocarboxylic anhydride of Part 2 (95.9 percent purity; 1.033 mols); 170 grams of 2-allyl-3-methyl-2-cyclopenten-4-ol-1-one having a purity of 89.8 percent (1 mol) and containing 3.33 percent (0.033 mols) of 3-hydroxy-8-nonen-2,5-dione; and 270 grams of dry dibutyl ether was refluxed at a temperature of 171° C. for a period of 4 hours. At the end of this time the solution contained 0.08 percent of the anhydride, by analysis, which indicated that 99.8 percent of the anhydride had reacted.

The solution was diluted with 84 grams of dibutyl ether and washed successively with 524 grams of aqueous sodium hydroxide (7.63 percent; 1 mol), 500 milliliters of dilute aqueous sodium hydroxide (2 percent) and 500 milliliters of water. The washes were then extracted in that order with 100 milliliters of dibutyl ether. The extract and the washed oil were combined and stripped to a kettle temperature of 80° C. at an absolute pressure of 5 millimeters of mercury. The residue, after steam-stripping and sparging with nitrogen, weighed 312 grams and had an index of refraction ($n_D^{30}$) of 1.5038. Upon analysis by the ethylene diamine method the residue was found to have an allethrin content of 91.8 percent, and a chrysanthemummonocarboxylic acid content of 0.08 percent. The anhydride content was nil. Taking credit for 4 grams of product consumed in analysis the yield of allethrin based on the 2-allyl-3-methyl-2-cyclopenten-4- ol-1-one was 96.0 percent. Analysis of the allethrin washes showed that 183 grams (1.088 mols) of chrysanthemummonocarboxylic acid had been extracted.

EXAMPLE 6

A mixture of 173.3 grams of chrysanthemummonocarboxylic anhydride having a purity of 94.9 percent (0.517 mol); 84 grams of 2-allyl-3-methyl-2-cyclopenten-4-ol-1-one having a purity of 90.45 percent (0.5 mol) and containing 3.37 percent (0.017 mol) of 3-hydroxy-8-nonen-2,5-dione; and 134.0 grams of dry dibutyl ether was refluxed at a kettle temperature 168° C. for a period of four hours. At the end of that time analysis of the solution indicated that the anhydride content was 0.29 percent (0.004 mol) and that 99.2 percent of the starting amount had been reacted. The solution was diluted with 42 grams of dibutyl ether, to prevent saponification of the allethrin during washing with alkali, and the diluted solution stirred at 25° C. to 30° C. while 254 grams of aqueous sodium hydroxide (7.9 percent concentration; 0.5 mol) were added dropwise over a period of 20 minutes. The oil layer was then separated and washed successively with 250 milliliters of aqueous sodium hydroxide (2 percent) and 250 milliliters of water. Analysis of the caustic washes showed that 0.5455 of caustic had been consumed. To minimize the mechanical loss of allethrin, the washes were extracted successively with 100 milliliters of dibutyl ether. The washed oil and ether extract were combined and stripped to a kettle temperature of 80° C. at an absolute pressure of 5 millimeters of mercury. The residue was steam-stripped and sparged with nitrogen to remove traces of volatile material. The residue product of allethrin upon analysis by the ethylene diamine method was found to contain 91.3 percent of allethrin, 0.3 percent of acid as chrysanthemummonocarboxylic acid, and 0.2 percent by weight of chrysanthemummonocarboxylic anhydride. The residue product weighed 155 grams and had an index of refraction ($n_D^{30}$) of 1.5026. In addition, 3.8 grams of the product were consumed in the analysis. Accordingly, the total weight of allethrin produced was 158.8 grams and the yield based on the 2-allyl-3-methyl-2-cyclopenten-4-ol-1-one was 96.0 percent.

The sum of the equivalents of acid in the caustic washes, plus the 0.4800 equivalents of allethrin produced plus the 0.0032 equivalents of acid impurity and 0.0020 equivalents of anhydride impurity in the product gave a total of 1.0135 equivalents. This sum amounted to 99.6 percent of the equivalents of anhydride charged.

EXAMPLE 7

A mixture of 181 grams of chrysanthemummonocarboxylic anhydride having a purity of 96 percent (0.547 mol), 96 grams of 2-allyl-3-methyl-2-cyclopenten-4-ol-1-one having a purity of 89 percent (0.564 mol), 600 grams of dibutyl ether solvent and a trace of hydroquinone inhibitor was refluxed at a temperature of 152° C. for a period of 5 hours. Analysis of the solution at this stage indicated that no anhydride was present. The mixture was washed successively with 1.4 liters of aqueous sodium hydroxide (2 percent; 0.7 equivalents), 0.4 liter of aqueous sodium hydroxide (2 percent; 0.2 equivalents) and 0.4 liter of water. The washed oil was stripped to a kettle temperature of 80° C. at an absolute pressure of 5 millimeters of mercury, and then stripped with steam to remove traces of volatile materials. The residue product thus obtained was found by analysis to contain allethrin 89.7 percent; chrysanthemummonocarboxylic acid, 0.3 percent; and chrysanthemummonocarboxylic anhydride, nil. The yield of contained allethrin was 90 percent, based on the anhydride charged, and the efficiency 95 percent.

To recover the chrysanthemum acid formed in the esterification, the two caustic washes were combined and stirred with 200 grams of diisopropyl ether while 111 grams of concentrated hydrochloride (1.1 equivalents) were added with cooling to maintain the temperature at 30° C. A second extraction was made with 100 grams of diisoproply ether and the extracts then combined and distilled. Chrysanthemummonocarboxylic acid was recovered as a distillate of 99.4 percent purity in an amount which was 93 percent of the acid present in the esterfication mixture.

EXAMPLE 8

A mixture of 621 grams of 2-allyl-3-methyl-2-cyclopenten-4-ol-1-one having a purity of 75.6 percent (3.09 mols), 2178 grams of dibutyl ether solvent, 1016 grams of chrysanthemummonocarboxylic anhydride of 93.9 percent impurity (3.0 mols) and a trace of hydroquinone inhibitor were refluxed for a period of 5 hours. The kettle temperature was 152° C. The solution, which at this stage was found to contain no anhydride, was washed successively with 7 liters of aqueous sodium hydroxide (2 percent; 3.5 equivalents), 2.8 liters of aqueous sodium hydroxide (2 percent; 1.4 equivalents), and 2.8 liters of water. The washed oil was stripped to a kettle temperature of 80° C. at an absolute pressure of 6 millimeters of mercury and then stripped of volatiles with steam. There was obtained 988 grams of a residue product containing allethrin, 81.9 percent; chrysanthemummonocarboxylic acid, 0.5 percent; and anhydride, nil, by weight. The yield of contained allethrin was 89 percent based on the anhydride charged. This residue product was distilled in a molecular still (falling-film type) to collect two distillate fractions. The fore-fraction contained 6.5 percent of the allethrin charged to the still and had a purity of 50 percent by weight. The hearts-fraction contained 82 percent of the allethrin charged and its purity was 91 percent. The remainder of the allethrin was in the still residue and had a purity of 77 percent.

The caustic washes containing the chrysanthemummonocarboxylic acid were combined, acidified with hydrochloric acid and extracted with isopropyl ether as described in the preceding example. The ether extracts were combined and distilled to obtain chrysanthemummonocarboxylic acid of 94.6 percent purity. The amount of distilled acid recovered was 94.6 percent of that present in the esterfication mixture.

EXAMPLE 9

A mixture of 33 grams of chrysanthemummonocarboxylic anhydride having a purity of 97.0 percent (0.1 mol); 23 grams of 3-hydroxy-8-nonen-2,5-dione having a purity of 66.2 percent (0.09 mol) and 100 grams of dibutyl ether was refluxed at a temperature of 156° C. to 159° C. for a period of ten hours. This reaction mixture, which was found by analysis to contain 0.88 percent anhydride, was washed successively with 250 and 100 milliliter portions of two percent aqueous sodium hydroxide solution (0.125 and 0.05 equivalents, respectively). The second wash was basic which indicated that all free acid had been removed. The washed oil amounting to 88 grams was stripped of volatile material to a kettle temperature of 100° C. and a reduced pressure of 3 millimeters of mercury, absolute. There remained 18 grams of residue which had a refractive index ($n_D^{30}$) of 1.5110 and a specific gravity (20/20° C.) of 1.043. It was found to contain 9.0 percent of 2,5-dioxo-8-nonen-3-yl chrysanthemummonocarboxylate upon analysis by the ethylene diamine method; 2.3 percent chrysanthemummonocarboxylic acid, and 3.7 percent chrysanthemummonocarboxylic anhydride. According to these results the yield of the ester was 5.6 percent based on the hydroxydiketone.

EXAMPLE 10

To a mixture of 141 grams of 3-hydroxy-8-nonen-2,5-dione having a purity of 66.2 percent (0.55 mol); 47 grams of dry pyridine (0.6 mol) and 250 grams of dry dibutyl ether was added a solution of 95 grams of freshly distilled chrysanthemummonocarboxylic acid chloride in 95 grams of dry dibutyl ether. The acid chloride which had a purity of 98.5 percent (0.5 mol) was added dropwise over a period of 30 minutes. The reaction mixture was maintained at a temperature of 20° C. to 25° C. during the addition and for one hour thereafter to complete the reaction. The pyridine hydrochloride which formed (weight 75 grams, wet with dibutyl ether) was filtered out and the filtrate washed successively with 250 milliliters of water; 250 milliliters of aqueous hydrochloric acid (1 percent); two portions of 250 milliliters of aqueous sodium hydroxide (2 percent); and 250 milliliters of water. The washed oil was then stripped of volatile material by heating to a kettle temperature of 70° C. at a reduced pressure of 5 millimeters of mercury, absolute. There was obtained 168 grams of a residue product having a refractive index ($n_D^{30}$) of 1.4800. It was found to contain 59.1 percent of 2,5-dioxo-8-nonen-3-yl chrysanthemummonocarboxylate upon analysis by the ethylene diamine method, 7.4 percent chrysanthemummonocarboxylic acid and 3.6 percent chrysanthemummonocarboxylic acid anhydride. According to the foregoing results, the yield of ester was 62 percent based on the acid chloride.

The ester fraction that was obtained upon distillation of the residue product in a molecular still of the falling-film type was found to have the following properties: boiling point at an absolute pressure of 0.02 millimeters of mercury, 78° C.; refractive index ($n_D^{30}$) 1.4802; ester content by the ethylene diamine method, 78.5 percent; chrysanthemummonocarboxylic acid, 1.5 percent; and chrysanthemummonocarboxylic acid anhydride, 4.9 percent.

This improvement is not limited to the 2-allyl-3-methyl-2-cyclopenten-4-ol-1-one and the production of allethrin therefrom, but is applicable generally to substituted 3-methyl-2-cyclopenten-4-ol-1-ones wherein the substituent is in the 3-position on the cyclopentene ring, as represented by the formula

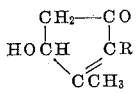

in which R can be allyl; 2-cyclopentenyl; furfuryl; benzyl; 2-butenyl; methallyl; or other unsaturated groups having from three to seven carbon atoms.

What is claimed is:
1. A process for making an ester of the general formula

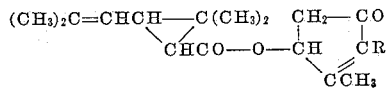

wherein R is an unsaturated group containing from three to seven carbon atoms and free of elements other than carbon, hydrogen and oxygen which comprises forming a mixture of chrysanthemummonocarboxylic acid anhydride and an alcohol of the general formula

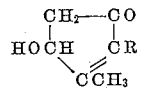

wherein R is as set forth above, and heating said mixture to a temperature between 50° C. and 200° C. whereby said anhydride reacts with said alcohol to form said ester.

2. In a process for making an ester of the general formula

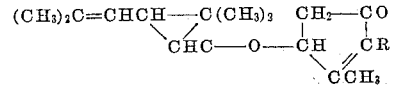

wherein R is of the group consisting of allyl, 2-cyclopentenyl, furfuryl, benzyl, 2-butenyl, methallyl and wherein an acid component which is chrysanthemummonocar- boxylic acid and an alcohol component which is of the general formula

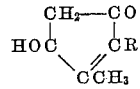

in which R is the same as stated above are separately prepared for the formation of the ester therefrom and wherein the alcohol component is contaminated with difficultly removable impurities reactive with chrysanthemummonocarboxylic acid chloride to form compounds of a structure similar to said ester but of lesser biological activity, the improvement which comprises heating a mixture of such contaminated alcohol component and chrysanthemummonocarboxylic acid anhydride to a temperature between 50° C and 200° C. whereby the anhydride reacts selectively with said alcohol components but not with the contaminants thereof to form said ester; washing the reaction mixture with dilute alkali to remove the chrysanthemummonocarboxylic acid also formed in the main reaction; and thereafter heating the reaction mixture to volatile low-boiling material therefrom.

3. In a process for making allethrin wherein an acid component which is chrysanthemummonocarboxylic acid and an alcohol component which is 2-allyl-3-methyl-2-cyclopenten-4-ol-1-one are separately prepared for formation of the ester therefrom and wherein the alcohol component so prepared is contaminated with difficultly removable impurities reactive with chrysanthemummonocarboxylic acid chloride to form compounds of a structure similar to allethrin but of lesser biological activity, the improvement which comprises heating a mixture of such contaminated 2-allyl-3-methyl-2-cyclopenten-4-ol-1-one and chrysanthemummonocarboxylic acid anhydride at a temperature between 50° C and 200° C., whereby the anhydride reacts selectively with 2-allyl-3-methyl-2-cyclopenten-4-ol-1-one but not with the contaminants thereof to form the ester which is allethrin; washing the reaction mixture with dilute alkali to remove the chrysanthemummonocarboxylic acid also formed in the main reaction; thereafter heating the reaction mixture to volatilize low-boiling material therefrom; and recovering allethrin as a residue product.

4. In a process for making allethrin wherein an acid component which is chrysanthemummonocarboxylic acid and an alcohol component which is 2-allyl-3-methyl-2-cyclopenten-4-ol-1-one are separately prepared for formation of the ester therefrom and wherein the alcohol component so prepared is contaminated with difficultly removable impurities reactive with chrysanthemummonocarboxylic acid chloride to form compounds of a structure similar to allethrin but of lesser biological activity, the improvement which comprises heating a mixture of such contaminated 2-allyl-3-methyl-2-cyclopenten-4-ol-1-one and chrysanthemummonocarboxylic acid anhydride at a temperature between 150° C. and 175° C., whereby the anhydride reacts selectively with 2-allyl-3-methyl-2-cyclopenten-4-ol-1-one but not with the contaminants thereof to form the ester which is allethrin; washing the reaction mixture with dilute alkali to remove the chrysanthemummonocarboxylic acid also formed in the main reaction; thereafter heating the reaction mixture to volatilize low-boiling material therefrom; and recovering allethrin as a residue product.

5. In a process for making allethrin wherein an acid component which is chrysanthemummonocarboxylic acid and an alcohol component which is 2-allyl-3-methyl-2-cyclopenten-4-ol-1-one are separately prepared for formation of the ester therefrom and wherein the alcohol component so prepared is contaminated with difficultly removable impurities reactive with chrysanthemummonocarboxylic acid chloride to form compounds of a structure similar to allethrin but of lesser biological activity, the improvement which comprises the steps of heating to its boiling temperature a mixture of the chrysanthemummonocarboxylic acid with a lower aliphatic monocarboxylic acid anhydride in an amount more than is required by theory to react with all of the chrysanthemummonocarboxylic acid to form the anhydride thereof; separating from the anhydride thus formed the unreacted lower aliphatic monocarboxylic acid anhydride and the lower aliphatic monocarboxylic acid also formed as a product of the main reaction; heating a mixture of said contaminated 2-allyl-3-methyl-2-cyclopenten-4-ol-1-one and said chrysanthemummonocarboxylic acid anhydride thus produced to a temperature between 50° C. to 200° C. whereby the anhydride reacts selectively with the 2-allyl-3-methyl-2-cyclopenten-4-ol-1-one, but not with the contaminants thereof, to form the ester which is allethrin; washing the reaction mixture with dilute alkali to remove chrysanthemummonocarboxylic acid also formed in the ester-producing reaction; thereafter heating the reaction mixture to volatilize low-boiling material therefrom; and recovering allethrin as a residue product.

6. In a process for making allethrin wherein an acid component which is chrysanthemummonocarboxylic acid and an alcohol component which is 2-allyl-3-methyl-2-cyclopenten-4-ol-1-one are separately prepared for formation of the ester therefrom and wherein the alcohol component so prepared is contaminated with difficultly removable impurities reactive with chrysanthemummonocarboxylic acid chloride to form compounds of a structure similar to allethrin but of lesser biological activity, the improvement which comprises the steps of heating to its boiling temperature a mixture of the chrysanthemummonocarboxylic acid with a lower aliphatic monocarboxylic acid anhydride in an amount more than is required by theory to react with all of the chrysanthemummonocarboxylic acid to form the anhydride thereof; separating from the anhydride thus formed the unreacted lower aliphatic monocarboxylic acid anhydride and the lower aliphatic monocarboxylic acid also formed as a product of the main reaction; heating a mixture of said contaminated 2-allyl-3-methyl-2-cyclopenten-4-ol-1-one and said chrysanthemummonocarboxylic acid anhydride thus produced to a temperature between 150° C. to 175° C. whereby the anhydride reacts selectively with the 2-allyl-3-methyl-2-cyclopenten-4-ol-1-one, but not with the contaminants thereof, to form the ester which is allethrin; washing the reaction mixture with dilute alkali to remove chrysanthemummonocarboxylic acid also formed in the ester-producing reaction; thereafter heating the reaction mixture to volatilize low-boiling material therefrom; and recovering allethrin as a residue product.

7. In a process for making allethrin wherein an acid component which is chrysanthemummonocarboxylic acid and an alcohol component which is 2-allyl-3-methyl-2-cyclopenten-4-ol-1-one are separately prepared for formation of the ester therefrom and wherein the alcohol component so prepared is contaminated with difficultly removable impurities reactive with chrysanthemummonocarboxylic acid chloride to form compounds of a structure similar to allethrin but of lesser biological activity, the improvement which comprises the steps of heating to its boiling temperature a mixture of the chrysanthemummonocarboxylic acid with a lower aliphatic monocarboxylic acid anhydride in an amount from 1.1 to 10 times that required by theory to react with all of the chrysanthemummonocarboxylic acid to form the anhydride thereof; separating from the anhydride thus formed the unreacted lower aliphatic monocarboxylic acid anhydride and the lower aliphatic monocarboxylic acid also formed as a product of the main reaction; heating a mixture of said contaminated 2-allyl-3-methyl-2-cyclopenten-4-ol-1-one and said chrysanthemummonocarboxylic acid anhydride thus produced to a temperature between 50° C. to 200° C. whereby the anhydride reacts selectively with the 2-allyl-3-methyl-2-cyclopenten-4-ol-1-one, but not with the contaminants thereof, to form the ester which is allethrin; washing the reaction mixture with dilute alkali to remove chrysanthemummonocarboxylic acid also formed in the ester-producing reaction; thereafter heating the reaction mixture to volatilize low-boiling material therefrom; and recovering allethrin as a residue product.

References Cited in the file of this patent

UNITED STATES PATENTS 2,603,652   Schechter et al. _____ July 15, 1952
2,689,863   Broderick et al. _____ Sept. 21, 1954

OTHER REFERENCES

Richter: Textbook of Organic Chemistry, pg. 181 (1938 ed.).

Harper: J. Chem. Soc., 892–893 (1946).

Hickinbottom: "Reactions of Organic Compounds," pg. 227 (1948).